US009836924B2

(12) United States Patent
Van Asdale et al.

(10) Patent No.: US 9,836,924 B2
(45) Date of Patent: Dec. 5, 2017

(54) BONUSING SYSTEM FOR CASINO GAMES

(71) Applicant: ROLLED UP GAMING PARTNERS, Reno, NV (US)

(72) Inventors: Shawn Michael Van Asdale, Reno, NV (US); Richard Brian Lopez, Reno, NV (US)

(73) Assignee: ROLLED UP GAMING PARTNERS, Reno, NV (US)

( * ) Notice: Subject to any disclaimer, the term of this patent is extended or adjusted under 35 U.S.C. 154(b) by 615 days.

(21) Appl. No.: 14/321,633

(22) Filed: Jul. 1, 2014

(65) Prior Publication Data

US 2016/0005272 A1 Jan. 7, 2016

(51) Int. Cl.
*A63F 13/00* (2014.01)
*G07F 17/32* (2006.01)

(52) U.S. Cl.
CPC ........ *G07F 17/3293* (2013.01); *G07F 17/322* (2013.01); *G07F 17/3244* (2013.01); *G07F 17/3258* (2013.01); *G07F 17/3262* (2013.01)

(58) Field of Classification Search
CPC ... G07F 17/32; G07F 17/3237; G07F 17/3244
USPC .......................................... 463/16–20, 40–42
See application file for complete search history.

(56) References Cited

U.S. PATENT DOCUMENTS

| | | | |
|---|---|---|---|
| 5,116,055 | A | 5/1992 | Tracy |
| 5,707,285 | A | 1/1998 | Place et al. |
| 5,885,158 | A | 3/1999 | Torango et al. |
| 6,168,520 | B1 | 1/2001 | Baerlocher et al. |
| 7,384,336 | B2 | 6/2008 | Torango |
| 7,931,532 | B2 | 4/2011 | Johnson |
| 2011/0034237 | A1 | 2/2011 | Schulhof et al. |
| 2014/0113712 | A1 | 4/2014 | Van Asdale |

OTHER PUBLICATIONS

"U.S. Appl. No. 13/656,745, Non Final Office Action dated Aug. 31, 2015".
"U.S. Appl. No. 13/656,745, Advisory Action dated Apr. 29, 2016", 3 pages.
"U.S. Appl. No. 13/656,745, Non Final Office Action dated Sep. 9, 2016", 28 pages.
"U.S. Appl. No. 13/656,745, Final Office Action dated Jan. 12, 2016", 21 pgs.

*Primary Examiner* — David L Lewis
*Assistant Examiner* — Ross Williams
(74) *Attorney, Agent, or Firm* — Kwan & Olynick LLP

(57) ABSTRACT

A bonusing system used in a casino environment is described. The bonusing system enables a player to make secondary wagers on a bonus outcome. In one embodiment, the bonusing system can include a bonusing device which is installed at a gaming table at which a card game is played, such as baccarat or black jack. In the card game, the player makes a primary wager on an outcome of a card hand. The bonusing device can be configured to select a bonus card hand from among a subset of card hands associated with the card game and output the selected bonus hand. Based upon one or more of a player's card hand, a dealer's card hand, the bonus card hand or combinations thereof, the bonusing device can determine whether a bonus is to be awarded. The bonus amount awarded can depend on the amount of the secondary wager.

22 Claims, 7 Drawing Sheets

BONUSING SYSTEM FOR CASINO GAMES

FIELD OF THE INVENTION

This invention generally relates to casino-based games, and more particularly to a bonusing system for card games, such as baccarat or black jack.

BACKGROUND

The basic object of most casino card games, which are typically played at a table, is for the player and house (represented by a dealer and a banker) to each make a card hand. The player makes a wager on the outcome of the card game. Typically, if the house's hand is better than the player's hand, the player loses their wager. If the player's hand is better than the houses hand, the player wins back their wager and some additional amount. In order for the game to be profitable for the casino, the rules have to provide the house with an edge.

In some games, the house's edge in the game is large enough that the player may be awarded a multiple of their wager in some circumstances. Players enjoy receiving a multiple of their wager, as opposed to just an even money type of bet. In most games, the house's edge rarely great enough to support a large multiple, such as a multiple greater than three.

To allow for larger multiples, the house edge can be increased. However, as the house edge increases, the players win much less often, which is undesirable to player's as it appears the house has too great an advantage. In view of the above, methods and apparatus are needed, which allow for a larger variability in player awards while keeping the house edge low enough that the game is viewed as fair.

SUMMARY

A bonusing system used in a casino environment is described. The bonusing system enables a player to make secondary wagers on a bonus outcome. In one embodiment, the bonusing system can include a bonusing device which is installed at a gaming table at which a card game is played, such as baccarat or black jack. In the card game, the player makes a primary wager on an outcome of a card hand. The bonusing device can be configured to select a bonus card hand from among a subset of card hands associated with the card game and output the selected bonus hand. Based upon one or more of a player's card hand, a dealer's (or banker's) card hand, the bonus card hand or combinations thereof, the bonusing device can determine whether a bonus is to be awarded.

The bonus amount awarded can depend on the amount of a bonus wager made on the bonus game outcome. The bonus game wager can be in addition to a wager made on the primary game. The bonus game can be associated with significant variability, such as a large progressive jackpot. The player can opt in and play the bonus game to enjoy the larger variability or may simply play the underlying primary game with its associated variability, which may be less than the bonus game.

One aspect of the described embodiment can include a bonus device. The bonus device can be coupled to a table where a game is played, such as a card game. The bonus device can include i) an input mechanism to receive wager information on an outcome of a bonus game; ii) a first communication interface configured to receive card information associated with a card game; iii) a second communication interface configured to communicate with a remote server to at least receive at least one progressive jackpot amount and send an amount used to increment the progressive jackpot amount and iv) a controller.

The controller can include a processor, a memory and a randomization source. The controller can be communicatively coupled to the input mechanism, the first communication interface, the second communication interface and a display. In one embodiment, the display can be coupled to a game table and used to display information about a bonus game.

The controller can be configured to: a) receive the wager information from the input mechanism, b) based upon the wager information, determine the amount and communicate the amount to the remote server; c) receive a communication indicating the card game is about to start and d) in response to receiving a communication indicating the card game is about to start, generate a first bonus hand value and a second bonus hand value using the randomization source and a probability table. The first bonus hand value can be selected from a first range of values, each of the values in the first range associated with a probability in the probability table, and the second bonus hand value is selected from a second range of values, each of the values in the second range associated with a probability in the probability table. The values in the first range and the values in the second range can be possible card hand values in the card game.

The controller can be further configured to 1) receive the card information; 2) based upon the card information, determine a first card hand value and a second card hand value and 3) determine whether the first card hand value matches the first bonus hand value, whether the second card hand value matches the second bonus hand value and whether the first bonus hand value matches the second bonus hand value.

A number of bonus outcomes can be based upon whether particular hand values match. For example, when the first card hand value doesn't match the first bonus hand value and the second card hand value doesn't match the second bonus hand value, the controller can determine a first bonus outcome. When the first card hand value matches the first bonus hand value or the second card hand value matches the second bonus hand value, determine a second bonus outcome.

Further, when the first card hand value matches the first bonus hand value and the second card hand value matches the second bonus hand value, determine a third bonus outcome. Yet further, when the first card hand value matches the first bonus hand value, the second card hand value matches the second bonus hand value and the first bonus hand value matches the second bonus hand value, determine a fourth bonus outcome using the probability table and the randomization source where the fourth bonus outcome includes a probability of awarding all or a portion of the progressive jackpot amount. After the bonus outcomes are determine, the controller can be configured to control output to the display of the first bonus hand value, the second bonus hand value, one of first bonus outcome, the second bonus outcome, the third bonus outcome or the fourth bonus outcome and the progressive jackpot amount.

In other embodiments, a progressive jackpot can be associated one or more of the first bonus outcome, the second bonus outcome, the third bonus outcome, the fourth bonus outcome or combinations thereof. Thus, when any of these bonus outcomes are triggered, a check can be carried to determine whether a progressive jackpot is to be awarded. In some instances, multiple progressive jackpots can be maintained and multiple checks can occur to determine whether one or more of the progressive jackpots has been won. Besides an occurrence of one of the bonus outcomes, other conditions which trigger a check to determine whether a progressive jackpot is to be awarded are possible and the example of a check when one or more of the bonus outcomes occurs is provided for the purposes of illustration only.

BRIEF DESCRIPTION OF THE DRAWINGS

The included drawings are for illustrative purposes and serve only to provide examples of possible structures and process steps for the disclosed bonusing system and methods. These drawings in no way limit any changes in form and detail that may be made to the invention by one skilled in the art without departing from the spirit and scope of the invention.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A bonusing system used in a casino environment is described. The bonusing system enables a player to make secondary wagers on a bonus outcome. In one embodiment, the bonusing system can be used at a table where a card game is played, such as baccarat or black jack.

The bonusing system is described with respect to FIGS. 1A-6. In particular, with respect to FIGS. 1A-1D basic components of the bonus system and its interaction with the components of a card game generated at a table are described. With respect to FIGS. 2A and 2B an example of a bonusing system used for baccarat is discussed. The implementation of a bonusing system with a black jack game is described in regards to FIGS. 3A and 3B.

Figure 4:
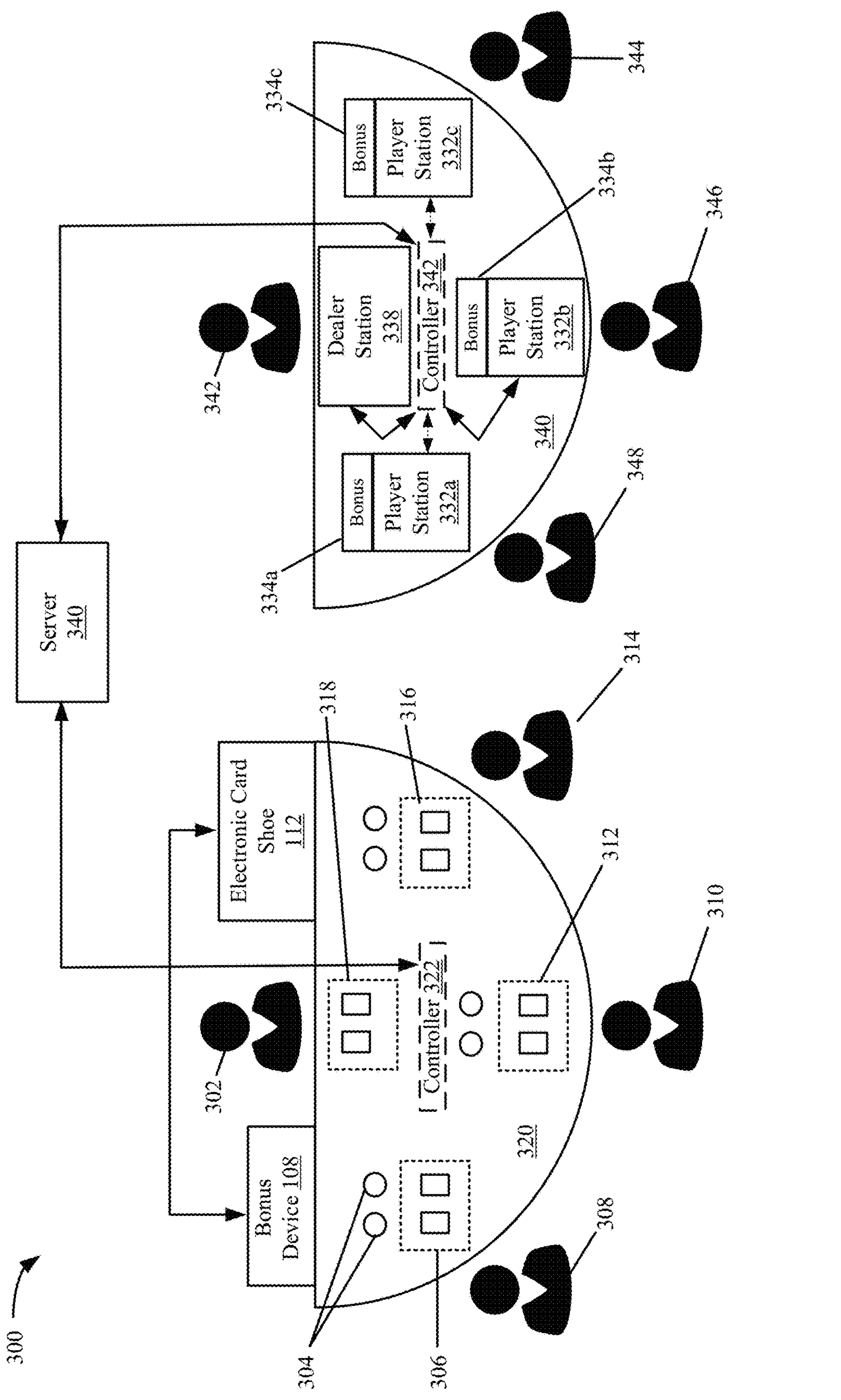
FIG. 4 is a block diagram of a bonusing system including multiple gaming tables and a linked progressive in accordance with the described embodiments.

With respect to FIG. 4 embodiments of a bonusing system including multiple gaming tables and a linked progressive is discussed. A bonusing presentation and a payout table used in a bonus game for baccarat are described with respect to FIG. 5. Finally, with respect to FIG. 6 a method used in a bonusing system is discussed. These figures are described in more detail, as follows.

FIGS. 1A to 1D are block diagrams of a bonusing system implemented on multiplayer wager-based gaming tables. The bonusing system enables a player to make secondary wagers on a bonus outcome. The system can also be implemented as part of a single player configuration or a slot machine configuration and thus, the gaming table is provided for the purposes of illustration only. First, some general embodiments related to primary games and bonus games are discussed. Then, more specific embodiments are discussed with respect to FIGS. 1A-1D.

The bonusing system can be used with a primary game on which a wager is made. The primary game, which is played, can include a number of possible positions, starting with an initial position, possibly including intermediary positions which may or may not require player input, and ending in a final position. For example, in a poker game, the initial position may be an initial hand of one or more cards dealt from a fifty two card deck. An intermediary position may be a hand where one or more cards from the initial hand are discarded. A final position may be final hand where the discarded cards are replaced. The outcome to the primary game may include comparing the final hand to a pay-table or the final hand to another player to determine an award or a winner of the game.

As another example, for a baccarat game, an initial position may be initial hands of two cards for a player and two cards for a banker dealt from a card shoe including multiple decks of cards. An intermediary position may include providing an additional card from the shoe to the player to finalize their hand where the banker hand is not yet finalized. A final position may include a final hand for both the player and the banker. The outcome of the primary game may be determined based upon comparing the final player hand to the final banker hand.

In yet another example, for a black jack game, an initial position may be an initial hand for a player and a dealer dealt from one or more fifty two card decks. An intermediary position may include a finalized player hand, such as resulting from providing additional cards to the player, and an initial dealer hand. A final position may include a final dealer hand and a final player hand. The outcome of the primary game may be determined by comparing the final dealer hand and the final player hand.

In a further example, an initial position of a slot game may include a display of an initial combination of symbols. The intermediary position of the slot game may show the symbols in flux, such as one or more symbols moving on a mechanical slot reel or video display screen. A final position of the slot game may show a final combination of symbols. The outcome of the slot game can be determined by comparing the final combination of symbols to a payout table.

In a yet further example, an initial position of a pai gow poker game can be an initial distribution of cards to a player and a dealer. An intermediary position can result from the player arranging their initial distribution of cards into multiple card hands, such as a two card hand and a five card hand. A final position may involve the dealer arranging their initial distribution of cards into multiple card hands and then comparing each of the dealer and player hands.

In each of the examples above, the initial position and the final position can be the same. For example, in a black jack game, one or both of the initial hands dealt to a player and a dealer may not change and thus, the initial hands may become final hands. As another example, in a baccarat game, one or both of the initial hands dealt to the player and the banker may not change and thus, the initial hands may become final hands.

The bonus system can be configured to generate an initial bonus position, an intermediary bonus position and a final bonus position which is related to the primary game. For example, for a baccarat game, a bonus initial hand can be generated. Then, the bonus initial hand can be finalized according to the banker rules or the player rules in baccarat to finalize the bonus hand. In one instance, whether the banker rules or the player rules are to be used to play the bonus hand can be randomly selected. In another embodiment, a final baccarat hand can be randomly selected. Thus, the initial bonus position and the final bonus position are the same.

The odds of generating the initial and/or final bonus position and a possible range of initial and/or final bonus positions can be different from the primary game. For example, in a black jack game, an initial bonus hand can be generated, such that the initial bonus hands are always in a range from fourteen to twenty one. The odds for each hand can be individually specified. For example, the odds of generating a fourteen, fifteen or sixteen can each be five percent and the odds of generating a seventeen, eighteen, nineteen can each be fifteen percent and the odds of generating a twenty or twenty one can be twenty percent each.

The different probabilities of receiving a particular hand can be used to increase awards associated with the bonus. For example, in the black jack example, the probability of the bonus black jack hand being a twenty can be greater than the odds of a dealer getting a twenty in the primary black jack game. Thus, a player can be provided a bigger award for beating a bonus hand of twenty than for beating a dealer hand of twenty.

In one embodiment, bonus initial positions can be generated which are not possible with the primary game. For example, an initial bonus position for a black jack game can be in the range of the seventeen to twenty three. In a traditional black jack game, initial positions of twenty two and twenty three, which are busts, are not allowed.

The initial bonus position may or may not be a final position. For instance, as described above, the initial bonus position for a black jack game can range from fourteen to twenty one. In one embodiment, the initial bonus position can be the final bonus position. Thus, when the initial bonus position is a fourteen, it doesn't change. In another embodiment, the bonus rules may require that an additional card be added when a fourteen, fifteen or sixteen is the initial bonus position and hold when the initial bonus position is a seventeen above. When an additional card is required, the additional card can be selected from a standard fifty two card deck, multiple standard decks or a non-standard deck. For example, a non-standard deck can be a deck where all the tens and face cards are removed.

In particular embodiments, a bonus outcome can be based upon comparing all or a portion of a position in a primary game to a bonus position. For example, in baccarat, a value of an initial player hand in the baccarat game can be compared to a value of an initial bonus hand and based upon the comparison, a bonus outcome can be determined. In another example, in baccarat, values of an initial player hand and an initial banker hand can be compared to an initial bonus hand and based upon the comparisons a bonus outcome can be determined. In yet another example, in baccarat, an initial player hand and final bonus hand can each be compared to a bonus hand which doesn't change and based upon the comparisons a bonus outcome can be determined.

In a further example, in baccarat, a final player hand and a final banker hand can be compared to a bonus hand which is initial generated and doesn't change and based upon the comparisons a bonus outcome can be determined. Next, with respect to FIGS. 1A-1D, a specific example of a bonus system used with a gaming a gaming table is described.

Figure 1B:
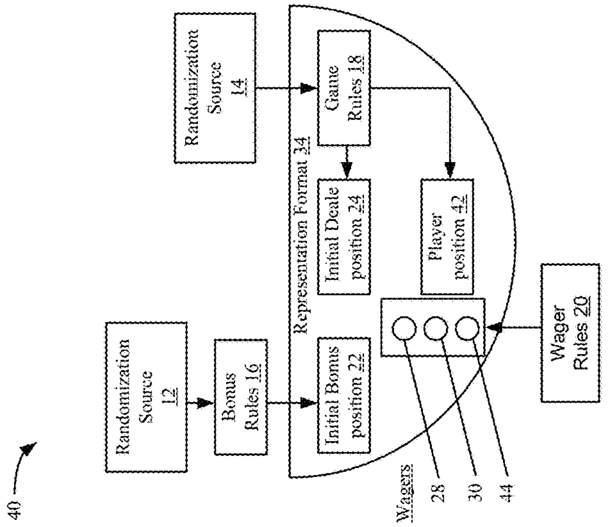
FIGS. 1A-1D are block diagrams of a bonusing system implemented on wager-based gaming table in accordance with the described embodiments.
Figure 1A:
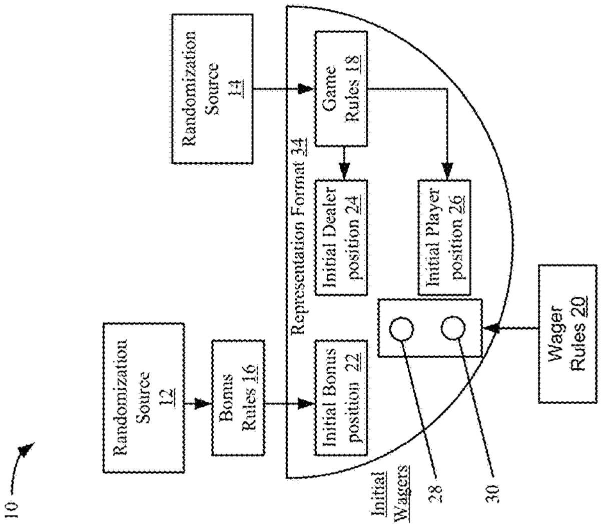

In FIG. 1A, a state 10 of a system, including a bonusing system used on a game table, is described. The state 10 of the system is shown in an initial position at the start of a wager-based game. The state 10 of the system includes two randomization sources 12 and 14. The randomization sources, such as 12 and 14, can be electronic random number generators, a tangible set of cards, virtual set of cards, dice, etc.

The randomization sources, such as 12 and 14, are used to distribute items from a set of items. The selection criteria which define the set can be incorporated into the randomization source in different ways. In one embodiments, the set of items can be a tangible set of cards where the set of cards including their various values can be selected, such as in a fifty two card deck. The tangible set of cards can be randomly mixed together to define an order and then cards can be selected from the set according to the randomly generated order, such as from the top of a stack of shuffled cards.

In one embodiment, a mechanical card shuffler can be used to randomize one or more standard fifty two card decks which are placed in the shuffler. In another embodiment, the cards can be manually shuffled. The shuffled cards can be placed in a shoe and then distributed from a shoe.

As another example, as described above, a random number generator can be used to select values of a card hand according to a stored probability distribution. The probability distribution can specify a range of numbers for each possible hand and total number range where range for each hand divided by the total number range provides a probability of the hand being selected. Thus, the value of the card hand can be selected by using a random number generation to generate a number within the total number range and then looking up the corresponding value of the card hand. The selectable values can vary depending on the type of game or bonus and the rules associated with the game or bonus.

The selected value of the card hand can be output to a display. The value can be represented as a number. For example, a value of eight for a baccarat hand or a value of fifteen for a black jack hand can be selected. The value of the hand can be simply output to the display (e.g., see FIG. 5). In another example, a combination of cards, such as two cards found in a fifty two card deck, can be selected which match the value of the hand. Then, the selected cards can be graphically rendered to a display.

In another example, numbers representing each card in a deck of cards can be randomly ordered. Then, the numbers can be selected according to the random order which was generated. For each number which is selected, a graphical representation of the card can be output to the display. For example, if the number one represents an ace of spaces, then when the number one is selected, a graphical representation of the ace of spades can be output to the display. Multiple decks can be constructed and selected in this manner. For example, the cards in two standard decks can be numbered from one to one hundred and four and then randomly ordered.

The bonus rules 16 and the game rules 18 can be used to determine how the bonus game and the primary game progress from an initial position to a final position. In FIG. 1A, a position bonus position 22 determined from the bonus rules 16 and an initial dealer position 24 and initial player position 26 determined from the game rules. Not all games will have a dealer position and a player position. For example, baccarat has a banker and a player position whereas another game may, such as poker, may have multiple players competing against one another. Thus, the example shown in FIG. 1A is for the purposes of illustration only.

All or a portion of the bonus rules 16 and/or the game rules 18 can be implemented electronically or manually. For example, in one embodiment, the bonus rules and randomization source 12 can be embodied in a bonus controller including a processor and memory. In addition, the bonus controller can have access to communication and power interfaces which allow the bonus controller to communicate with remote devices and receive power. The bonus controller can be configured to determine the initial bonus position and progress the bonus position from its initial state to the final state according to the bonus rules. The one or more bonus positions can be graphically represented using a display device in response to commands from the controller.

In one embodiment, an electronic card shuffler configured to shuffle one or more decks can be used as the randomization source 14. The shuffled decks can be placed in a shoe and then a live dealer can distribute the cards. Thus, the live dealer may be in charge of distributed the cards in accordance with the game rules 18. The live dealer can generate the initial dealer position 24 and the initial player position 26 in accordance with the game rules.

In other embodiments, the game rules 18 can be implemented via a game controller includes a processor and a memory. The randomization source 14 can be implemented as part of the game controller. Using the randomization source 14, the game controller can generate card hands at each stage in the wager-based game associated with the game rules 18 where the card hands are output to a display. In a particular embodiment, a single controller can be configured to control one or more player stations, a dealer station and a bonus device to implement the game and bonus functions associated with the primary game and the bonus game described herein. In other embodiments, the bonus functions and the game functions can be distributed between two or more controllers, such as a bonus controller and a game controller.

When a live dealer and tangible cards are used, it may be possible to estimate the player hand and the dealer hand at each stage in the game. For example, the electronic card shoe can include sensors which read card information from each card as it is distributed. For a game like baccarat, where there are no decisions made by a banker or the player to progress the game, a logic device may be able to determine what the dealer and player hands should be based upon on an assumed dealing pattern and which cards are drawn. However, if the dealing pattern is not followed correctly then the estimate of the player hand may be in correct.

In one embodiment, the logic can be configured to output the values it associates with each hand which may not match the actual hands if the cards have been dealt incorrectly. When the values don't match, the system can be configured to allow a manual entry of the card hands. For example, in blackjack, the system may allow the dealer to input the values of each hand resulting from a card dealing mistake.

In another embodiment, an input device may be provided to a live dealer which allows the live dealer to indicate which cards are going to which player. For example, in a black jack game, the dealer can use the input device to indicate whether a card goes to a first player or a second player depending on whether the first player decides to take an addition card or not. In yet another embodiment, an overhead camera and image recognition software can be used alone or in conjunction with the electronic card shoe to determine which cards have to gone to which player.

In one embodiment, a bonus controller can be configured to receive card information associated with a hand of a participant in the primary game, such as a dealer or a player. When a player makes a wager on a bonus outcome, the card information associated with the primary game can be used by the bonus controller to evaluate one or more card hands against a bonus card hand. Based upon received card information and the bonus card hand, the bonus controller can determine a bonus outcome for one or more participants in a bonus game. As described in more detail as follows, a controller can also be configured to receive wagering information and determine an amount of an award associated with a game outcome or a bonus outcome.

The primary game and the bonus game can allow wagering according to a set of wagering rules. The wager rules 20 can specify when wagers can be made and how much can be wagered for each of the primary game and the bonus game where the wagering rules for the primary game and the bonus game are different. For example, the primary game wagering rules and the bonus game wagering rules may allow only an initial bet to be made on an outcome to a primary game and the bonus game. In another example, the primary wagering rules may allow an initial bet to be made and then additional bets to be made depending how the positions associated with the primary game unfold. Whereas, the bonus game wagering rules may allow only an initial bet. In yet another example, the bonus game wagering rules may allow an initial bet to be made and additional bets to be made depending on how the bonus game progresses. In a further example, both the bonus game wagering rules and the primary game wagering rules can allow an initial bet and additional bets.

All or a portion of the primary game wagering rules and the bonus game wagering rules can be enforced by a live dealer, a single controller, multiple controllers or a combination thereof. For example, the live dealer can determine whether initial bets are made on the outcome of the primary game and the bonus game and whether the value of the bets meet minimum and maximum table limits where the player uses chips to indicate bets and a bet amount. After the initial bet, the dealer can notify a player when additional bets are allowed. When a player decides to make an additional bet, the dealer can enforce whether the bet is in accordance with the wagering rules. In FIG. 1A, a player is shown as having made additional bets 28 and 30 on the outcome of a primary game and a bonus game.

When a controller is used to enforce all or a portion of the primary game wagering rules and the bonus game rules, different technologies can be used to determine whether a wager is made and an amount of a wager. For example, when wagering chips are used, the wagering chips can electronically store their value, such as via an RFID tag. Sensors placed at certain locations in the table can be configured to determine whether one or more chips are placed at a certain location on the table associated with a bet on the primary game or the bonus game and/or a value of the wager.

In another example, virtual chips can be output to a display, such as a touch screen display. The player may be able to select chip amounts to make various wagers. For example, via the touch screen a chip output to the display can be selected and then moved to a location on the screen associated with the bonus wager. After the wager is made, the system can be configured to display a selectable indicator which allows the wager to be confirmed.

The information used to represent various positions in the primary game, bonus game and associated wagers can be in different representation formats 34. For example, bonus positions can be represented on a graphical display, the primary game can be represented using tangible cards and the wagers on the bonus game and primary game can be represented using tangible chips. In another example, the bonus positions can be represented on one or more displays, the bonus wagers can be represented on one or more displays, such as virtual chips, the primary game can be represented using tangible items, such as cards, and the primary wagers can be represented using tangible chips. In yet another example, the bonus positions, bonus wagers and primary wagers can be represented graphically on displays and the primary game positions can be represented using tangible cards.

In FIG. 1B, a second state 40 of the system is shown. In the second state 40, the player position 42 has advanced from the initial player position 26. The player position 42 may have advanced without the player making an additional decision.

For instance, an initial player baccarat hand can be played according to the Baccarat rules. In Baccarat, cards have a point value: a) cards two to nine are worth face value (in points), b) tens, jacks, queens and kings have no point value (i.e. are worth zero) and c) aces are worth 1 point. Hands are valued according to the rightmost digit of the sum of their constituent cards. For example, a hand consisting of 2 and 3 is worth 5, but a hand consisting of 6 and 7 is worth 3 (i.e. the 3 being rightmost digit in the combined points total. Thus, the highest possible hand value in Baccarat is 9.

In baccarat, if neither the Player nor Banker is dealt a total of eight or a nine in the first two cards (known as a "natural"), first for player's rules and then banker's rules are consulted. If a player has an initial total of zero to five, a third card is drawn. If the player has an initial total of six or seven, the hand is not changed.

Returning to FIG. 1B, an additional wager 44 has been made. The additional wager 44 may have resulted from some aspect of the primary game, such as a split or a double down, in black jack. In another example, the additional wager may be associated with the bonus game. For instance, as a result of and based upon the new player position 42, the wager rules 20 associated with the bonus game may allow a player to make an additional wager. For example, in Baccarat related bonus game, the bonus rules 16 may allow a player to make an additional wager, if a third card is drawn and their point total changes.

Figure 1D:
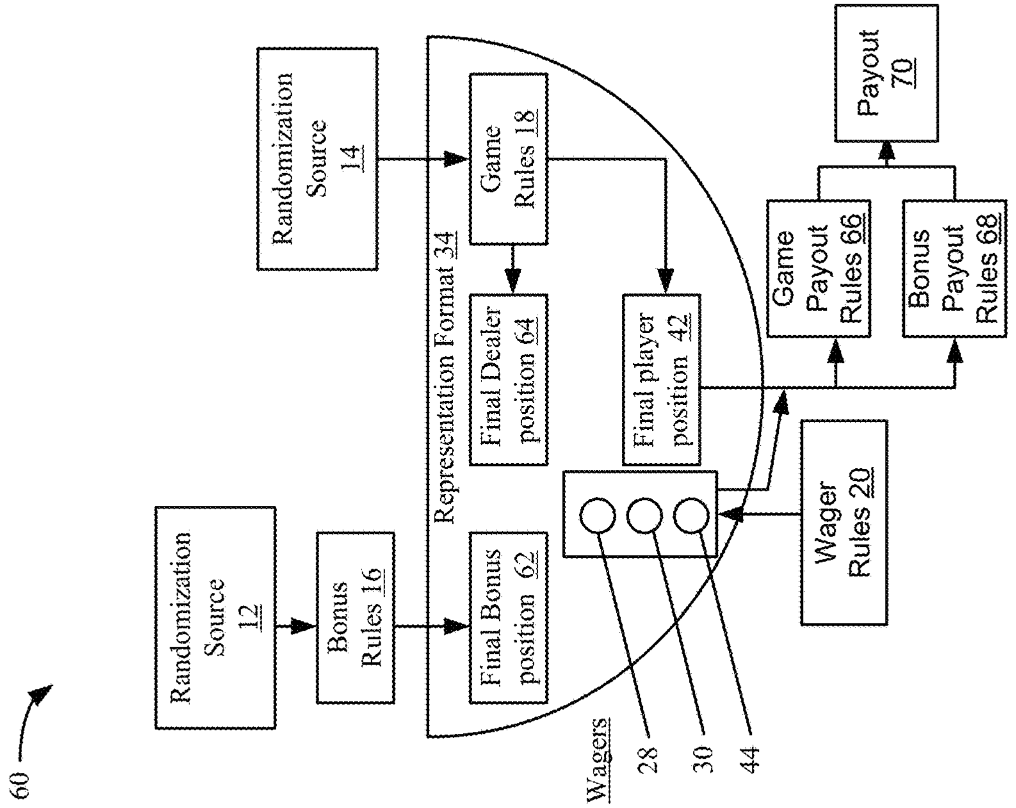
Figure 1C:
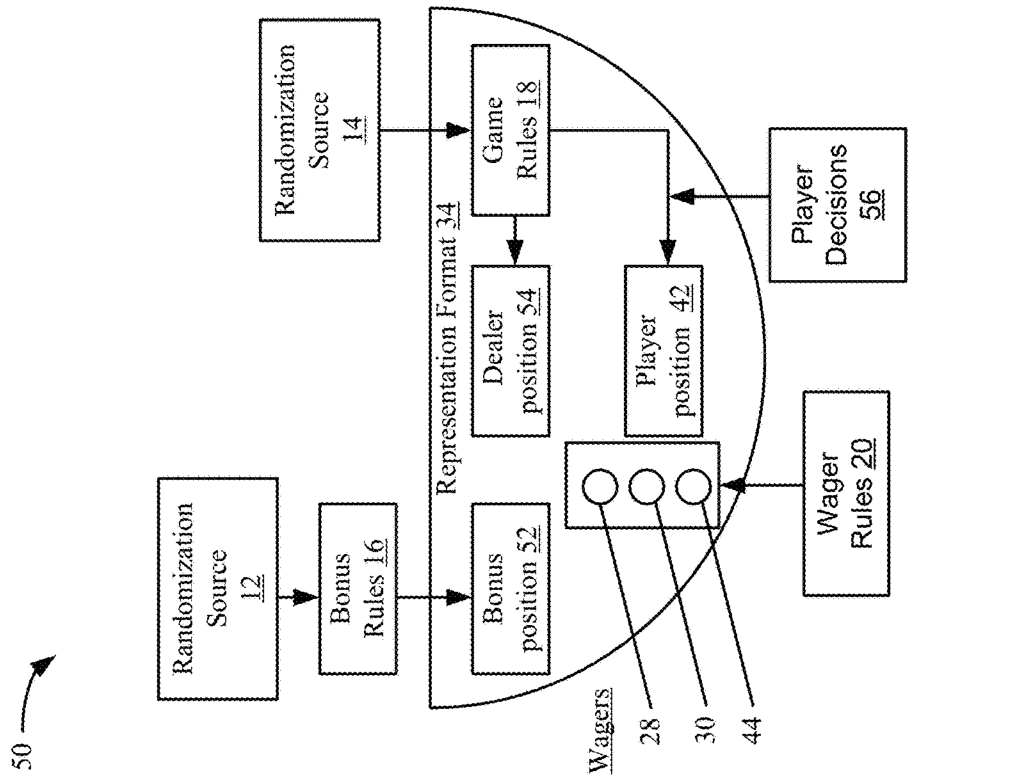

In FIG. 1C, a third state 50 of the system is shown. The player position 42 results from player decisions 56. For example, in a black jack game, a player decision may result from the player requesting an additional card. In a poker game, a player decision may result from the player selecting one or more cards to discard.

The dealer position 54 has changed from the initial dealer position 24. Further, the bonus position 52 has changed from an initial bonus position 22. As described above, the "dealer" could also be another "player" or a "banker" depending on the game being played.

In one embodiment, a change in a bonus position or a dealer position may involve information about the dealer position or the bonus position being revealed. As an example, in a bonus involving black jack, a bonus position can involve two cards, a ten and a four. Initially only the ten or the four may be revealed prior to the player playing their hand. Then, after the player plays their hand, the bonus position can change such that both the ten and the four are displayed. In another embodiment, both the ten and the four can be revealed prior to the player playing their hand. How the bonus information is revealed may affect the player decisions 56 and hence the player position 42.

In FIG. 1D, a third state 60 of the system is shown. In state 60, a final bonus position 62 and a final player position 64 are shown. The final positions, 62 and 64, may be the same or different than positions shown in FIG. 1A, 1B or 1C.

With player position 42, the bonus position 62 and the dealer position 64 finalized, a payout 70 can be determined. The payout 70 can involve awards from the primary game and the bonus game. In various embodiments, one or both of the game payout or bonus payout may be zero which may result in the game wager(s) or bonus wager(s) being lost. Further, one or both of the game payout or bonus payout can be some finite amount. The amount of the game payout or bonus payout can depend on the amount or amounts of the game wagers and bonus wagers.

The game payouts can be determined according to the game payout rules 66 and the bonus payout can depend on the bonus payout rules 68. In one embodiment, the bonus payout can depend on only the final bonus position 62 and may not be affected by the final player position 42 or the final dealer position 64. In another embodiment, the bonus payout can depend on both the final bonus position and the final player position. If multiple players are playing, then the bonus payout may be evaluated on a player by player basis, such that that final position of one player doesn't affect the bonus payouts of other players.

In yet other embodiments, the bonus payout can depend on the final bonus position and the final position of multiple players. In a further embodiment, when multiple players are playing, the final bonus position can be shared by multiple players or each player may be designated a separate final bonus position. When each player is designated with their own final bonus position, then a first bonus payout may be based upon a comparison of each player's final position to their own final bonus position. A second bonus payout may be based upon all of the player's final positions and all of the player's final bonus positions.

A greater number of variables in the bonus determination may allow for a greater number of possible combinations and possibly larger awards for certain rare combinations. In an additional embodiment, a bonus pay out can depend on the final player position 54, the final dealer position 64 and the final bonus position 62. Again, the final bonus position can be shared or may be designated for each participant. For example, the dealer can be designated with a final bonus position and the player can be designated with a final bonus position which is separate from the dealer bonus position. Then, the bonus payout can be based upon one or more of the final bonus position of the player, the final bonus position of the dealer, the final position of the player, the final position of the dealer, one or more wager amounts made by the player on the bonus game, one or more wager amounts made by the player on the primary game and combinations thereof.

Figure 2B:
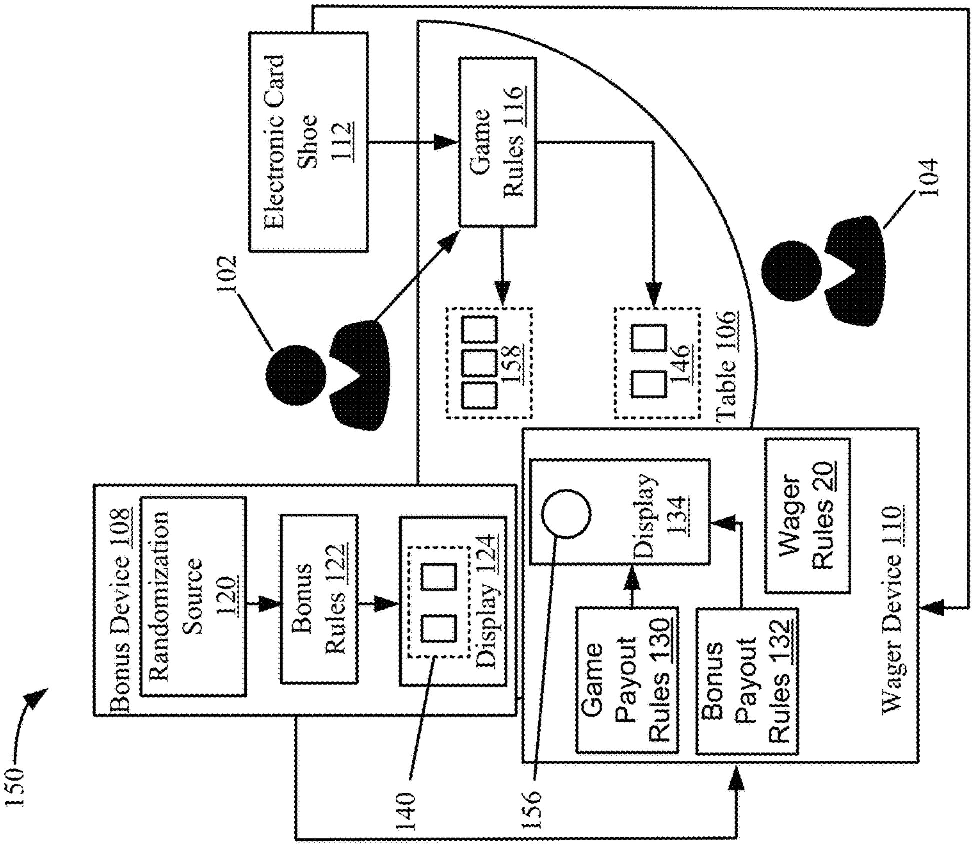
FIGS. 2A and 2B are block diagrams of a bonusing system used for baccarat in accordance with the described embodiments.
Figure 2A:
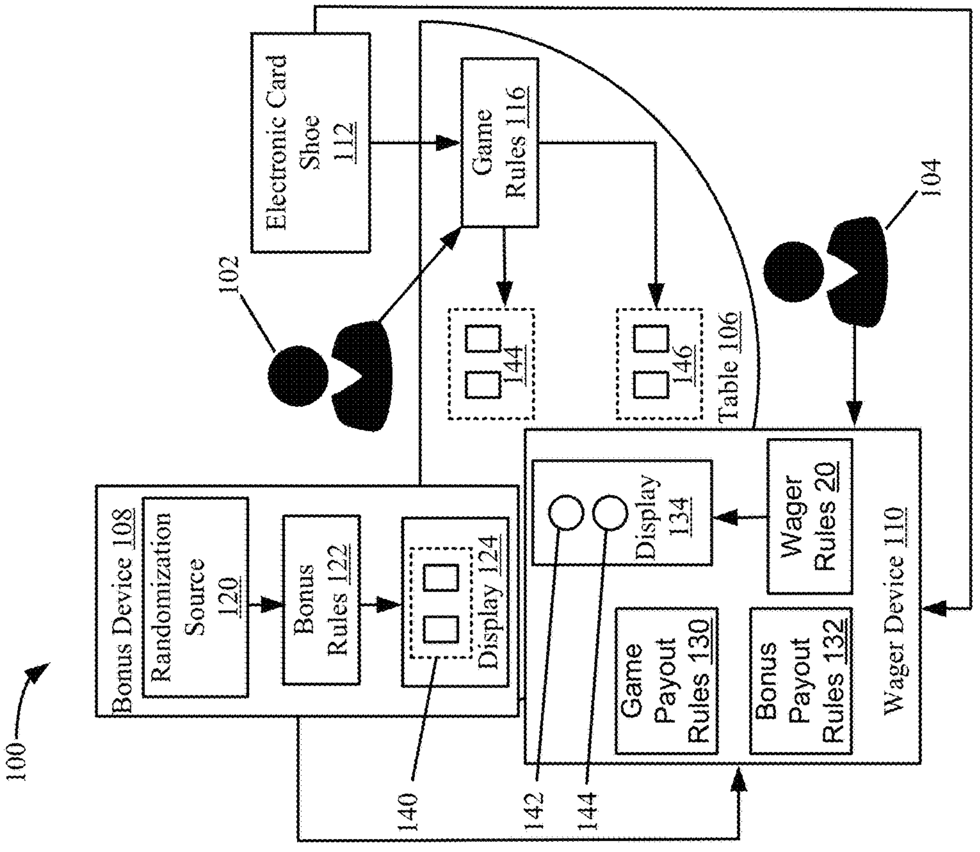
Figure 3A:
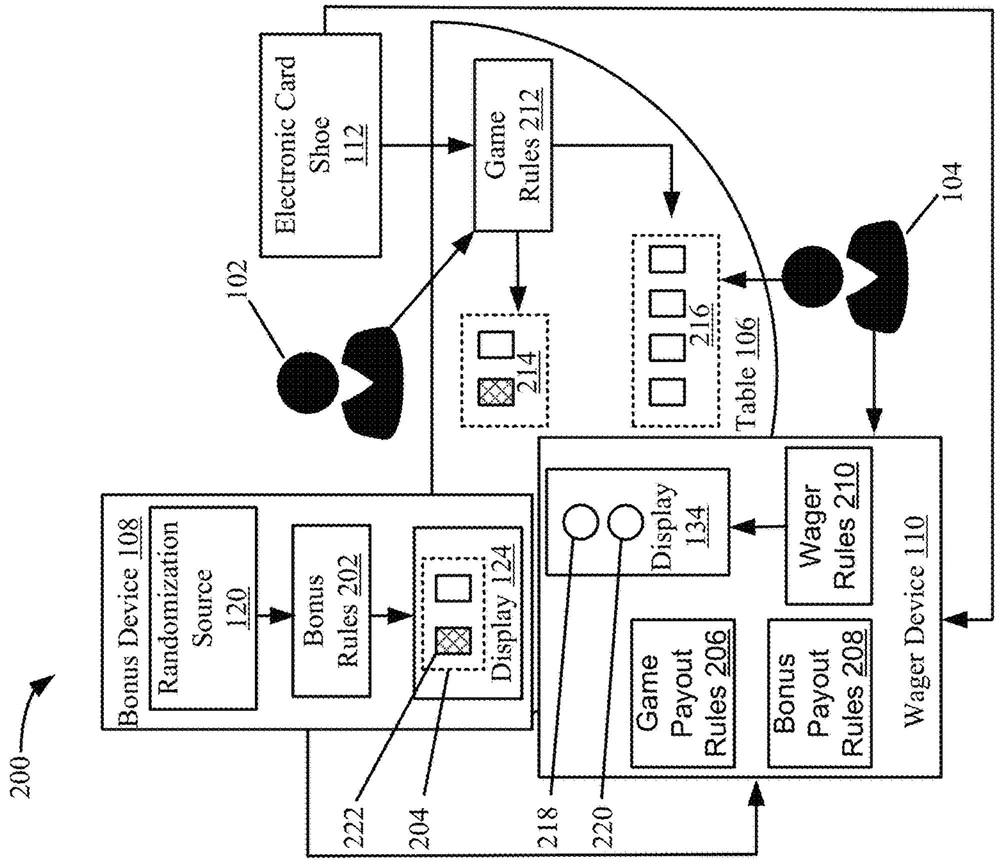
FIGS. 3A and 3B are block diagrams of a bonusing system used for black jack in accordance with the described embodiments.
Figure 3B:
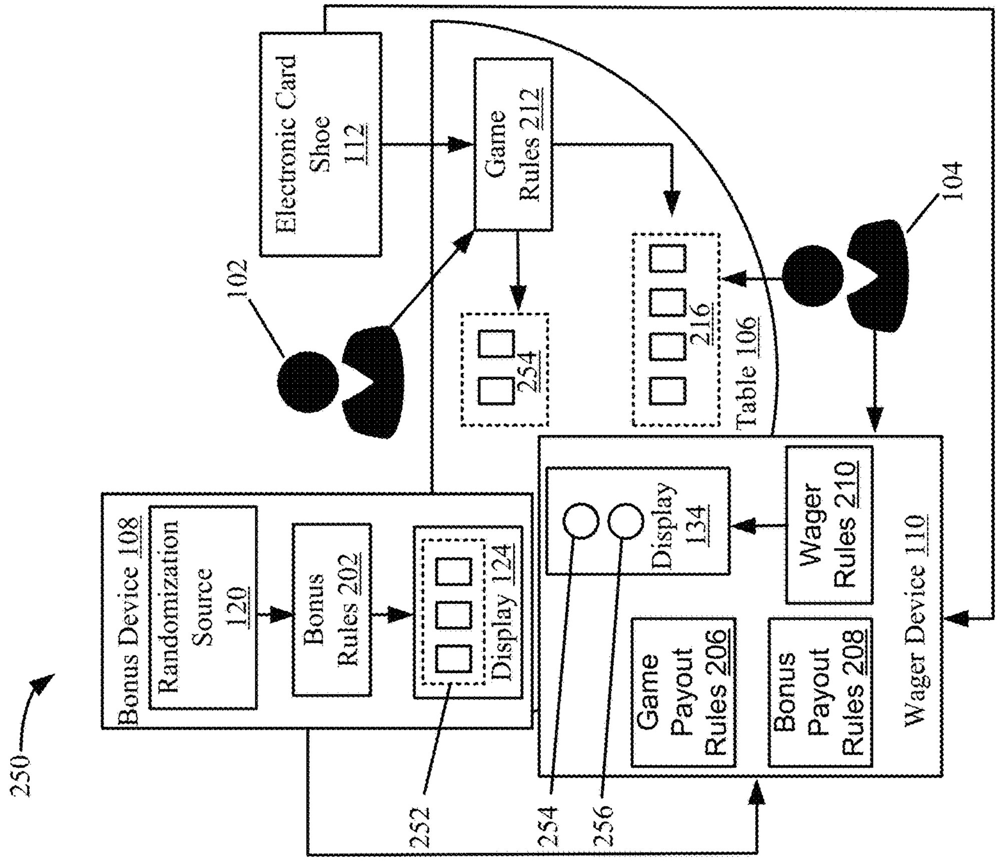

Next, specific examples of a system including game tables and a bonus device are described with respect to the game of baccarat (FIG. 2A and FIG. 2B) and the game of black jack (FIGS. 3A and 3B). These examples are provided for the purposes of illustration only and are not meant to be limiting. For instance, in FIGS. 2A, 2B, 3A and 3B, embodiments involving tangible cards dealt by a dealer are described. In other embodiments, virtual cards can be utilized.

FIGS. 2A and 2B are block diagrams of states 100 and 150 of a system including bonusing used for baccarat. In FIG. 2A, a dealer 102 deals tangible cards from an electronic card shoe 112. The cards may be shuffled using an automatic shuffler and can also be shuffled manually. In this example, the dealer 102 may deal the cards according to the game rules 116 on a table 106. Thus, the dealer 102 may deal a player hand 146 and a banker hand 144 that are composed of two cards in each hand.

As the cards are dealt, the cards can be identified, such as via sensors in the card shoe 112 or via image recognition from camera above the table 106. The card identification information can be sent to a wager device 110 and/or a bonus device 108. The identification information can include the suit, such as heart, diamonds, clubs or spades, a type of card, such as queen, king, jack, two of clubs, etc. and the value of the cards as described above for the rules of baccarat. In some instances, the suit of a card and or the type of card can be used in a bonus. In other embodiments, only the value of the cards may be needed. The type of cards that are dealt and their values may be stored to a non-volatile memory on the bonus device 124 or the wager device 110 for each game that is played.

The wager device 110 can include a display 134 and input devices, such as a touch screen and/or buttons. The wager device 110 can be configured to receive wagers, such as wager 142 on the primary game and wager 144 on a bonus. The wager device 110 can store a credit amount available to the player 104. The player 104 can use the credits to make wagers on the primary game and the bonus.

In one embodiment, the wager device 110 can be configured to enforce wager rules 20. The wager rules 20 can include a maximum and minimum amount for a primary game and a maximum and minimum amount for a bonus game. A controller in the wager device 110 can be configured to control a display and a touch screen to allow wagers to be input and the wager rules 20 to be enforced.

In another embodiment, a controller can be embedded or coupled to the table 106. In yet another embodiment, the controller can be located in a remote server. The controller can be configured to communicate with a display 134 and input devices (e.g., the display 134 can be a touch screen display) which allows wagers to be made in accordance with the wager rules 20. In particular embodiments, one or more displays can be coupled to a single a controller which enforces a set of wager rules for the table 106.

In particular embodiments, the display 134 associated with the wager device 110 can be mechanically coupled to the table 106. In other embodiments, a display, such as 134, can be embodied in a hand-held device, such as tablet computer. The tablet computer may allow players to make back bets based upon the play of other players. In general, a first portion of a plurality of displays can be mechanically coupled to the table 106 and a second portion of the plurality of displays can be hand-held where the first portion and second portion of the displays are communicatively coupled to a controller.

The bonus device 108 can include a randomization source 120, bonus rules 122 and a display 124. In one embodiment, the bonus device 108 can be a device which is shared by multiple players, such as 104, at the table 106. In another embodiment, multiple bonus devices can be provided, such as a bonus device for each player. For example, the bonus device functions and the wager device functions can be output to a single display where multiple displays, used by different players, are provided at the table 106.

Using the randomization source 120, the controller, which is coupled to the bonus device, can generate an initial bonus position in accordance with the bonus rules 122. For example, a two card bonus baccarat hand 140 can be generated and output to display 124. In another example, multiple bonus baccarat hands can be generated and output to the display 124, such as a bonus hand associated with the player 104 and a bonus hand associated with the banker 102. In general, one or more bonus baccarat hands can be generated.

The information from the electronic card shoe 112, the information on the bonus hands generated by the bonus device 108 and the wager information can be sent to a controller. With this information the controller can be configured to determine the bonus outcome and associated payout according to the bonus payout rules 132. In the example of FIG. 2A, the information, including the bonus hand information generated by the bonus controller on the bonus device 108, is sent to a controller associated with the wager device.

In FIG. 2B, a state 150 of the system after the banker hand 158 has been finalized is shown. The banker hand can be finalized according to the following baccarat rules. If the player 104 stood pat (i.e., has only two cards), the banker 102 regards only his own hand and acts according to the same rule as player 104. Thus, the banker draws a third card with hands zero to five and stands with a six or a seven. If the player 102 drew a third card, the banker 102 acts according to the following rules: a) if player drew a two or three, the banker draws with zero to four and stands with five to seven, b) if the player drew a four or a five, the banker draws with zero to five and stands with six or seven c) if the player drew a six or a seven, the banker draws with zero to six and stands with seven, d) if the player drew an eight, the banker draws with zero to two and stands with three to seven and e) if the player drew an ace, nine, ten, or face-card, the banker draws with zero to three and stands with four to seven. Other variations of baccarat are possible and these rules are provided for illustrative purposes only.

In FIG. 2B, the player has stayed pat. The initial banker hand 144 is valued between zero and five. Thus, the banker draws a third card to produce the finalized banker hand 158. In this example, the bonus hand 124 doesn't change from state 100 to 150. In other embodiments, the one or more bonus hands may change between an initial bonus position and a final bonus position.

With the banker hand information 158, the player hand info 146, the bonus hand information 124 and the information associated with wagers 142 and 144. The bonus payout and game payout can be determined according to the game payout rules 130 and the bonus payout rules 132. In FIG. 2B, a single payout 156 is displayed. The single payout 156 is a bonus payout. The game payout is zero and the wager was lost. In other embodiments, a game payout and no bonus payout can be displayed or a game payout and a bonus payout can be displayed. The bonus and/or game payout can be used for additional wagers.

FIGS. 3A and 3B illustrate two states, 200 and 250 of a system, including bonusing, used for black jack. In 200, the dealer hand 214 and the player hand are dealt according to the game rules 212, which can vary according to the location, i.e., house rules. The dealer hand 214 is shown in an initial position with only one card revealed. The player hand 216 is in intermediary position where four cards have been dealt. The player has made a wager 218 on the game outcome and a wager 220 on the bonus outcome.

In some instances, the player may make decisions based upon the dealer hand 214 and the bonus hand 204. For example, the player may choose to stay with a hand value where they normally might draw an additional card because they believe they have a good chance of beating the bonus hand 204. The player may make this decision even though standing lessens their odds of beating the dealer hand 214.

The bonus hand 204 consisting of two cards is output to display 124 in accordance with the bonus rules 202. In this example, one of the cards 222 in the bonus hand is not revealed until the player has finalized their hand. For multiple players, the bonus hand may not be revealed until all the players, such as 104, at the game table 106 have finalized hands.

In state 250, the dealer hand 254 and the bonus hand 252 have been finalized. The dealer hand 254 is not supplemented with an additional card. However, for the bonus hand 252, the hidden card has been revealed and an additional card has been added.

As described, the bonus hand 204 can be selected from a range that is different from the hands which are dealt to the dealer 102 and the player 104. For example, the initial bonus hand 204 may be selected from the range of seven to eleven and seventeen to twenty one. When the initial hand 204 is between seventeen and twenty one, no additional cards are dealt. However, when the initial hand 204 is between seven to eleven, one or more additional cards may be drawn for the bonus hand 252.

In state 250, a third card is shown as being drawn to complete the bonus hand 252. In one embodiment, the third card may be drawn from a simulated fifty two card deck. In another embodiment, the third card may be selected from a different range of values. For example, as described above, when a hand with a value between seven and eleven is selected for the bonus hand 204, a third card may be selected which is either a nine or a ten, such as a thirty percent chance of drawing a nine and a seventy percent chance of drawing a ten.

With the hands finalized, the game payout and bonus payout can be determined according to the game payout rules 206 and the bonus payout rules 208. In state 250, a separate game payout 254 and bonus payout 256 have been awarded. For instance, the player hand 216 may have beaten both the bonus hand 252 and the dealer hand 254 to earn a bonus. As another example, the player hand 216 may have tied both the dealer hand 254 and the bonus hand 252 to earn the bonus payout 256.

Next, some additional embodiments, which include multiple players and linked tables, are described. FIG. 4 is a block diagram of a state 300 of a system including multiple gaming tables, 320 and 340, and a server 340. The server 340 is coupled to gaming table 320 and 340. In particular, the server 340 receives wagering information which is used to increment a progressive jackpot. The progressive jackpot amount can be sent and output at each of the gaming tables, 320 and 340.

At table 320, a dealer 302 controls play of a card game by dealing from an electronic card shoe 112. Three areas, 306, 312 and 316, receive card hands associated with players 308, 310 and 312 respectively. Two areas, such as 304, are designated for player wagers. One wager can be associated with the primary game and the second wager can be associated with the bonus game. In this example, chips with communication capabilities are utilized. The chips can be detected using sensors to determine whether a primary wager or bonus wager has been made and the amount of each wager.

In one embodiment, a table controller 322 can receive information from the bet sensors and determine whether a wager has been made and an amount of the wager. The controller can send wager information to the server 340. At the server 340, a portion of the wager amounts can be allocated towards one or more progressive jackpots. The controller 108 can also be configured to receive information from the bonus device 108.

As previously described, the bonus device 108 can be configured to generate a bonus game. Further, the bonus device can be configured to receive and display progressive jackpot amounts received from the server 304. In addition, the bonus device and/or the controller can be configured to determine when a progressive bonus has been won and inform the server 304 that this event has occurred. The server 304 may then reset the progressive bonus and inform the other tables of the new value.

At table 340, a dealer station 338 and player stations, 334*a*, 334*b* and 334*c*, are coupled to the controller 342. The dealer 342 operates the dealer station 338 to deal virtual cards, which are displayed on player station 332*a*, 332*b* and 332*c*. The dealer stations and player stations each include displays and input devices. Players 344, 346 and 348 can view their virtual cards, make wagers on the primary game and bonus game and view bonus outcomes via the player stations using the display and input devices. In this example, individual bonus outcomes, such as 334*a*, 334*b* and 334*c*, are generated for each player. On table 320, the three players, 308, 310 and 314 share a bonus outcome.

The controller 342 receives wager information associated with the primary game and the bonus game from the player stations. In one embodiment, the controller 342 can determine a fraction of the primary game wager, a fraction of the bonus game wager or combinations thereof to send to the server 340. The server 340 can use this information to increment a primary game progressive and/or a bonus game progressive. The server 340 can regularly send updates of the current amounts of the progressive jackpots to the controller 342. The current amounts can be output on each of the player stations.

Figure 5:
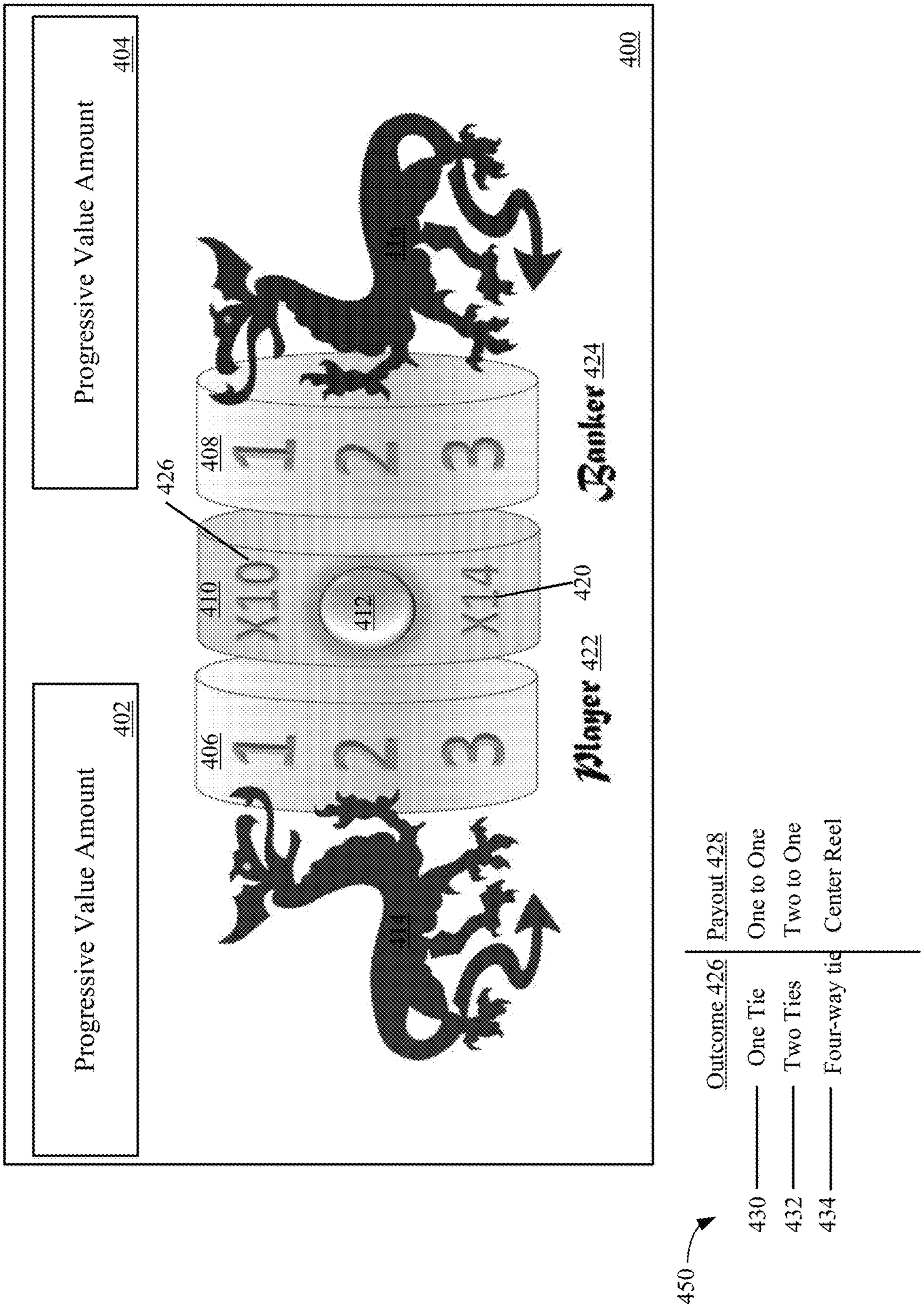
FIG. 5 includes a screen shot of a bonusing presentation and a payout table used in a bonusing system in accordance with the described embodiments.

Next, a bonus game for a baccarat game is described. The bonus game may be output via one of the bonus devices previously described with respect to FIGS. 1A-4. FIG. 5 includes a screen shot 400 of a bonusing presentation 400 and a payout table 450 used in a bonusing system. The bonusing system includes two progressive jackpots. The progressive value amounts, 402 and 404, for each of the two progressive jackpot amounts is output to the screen.

Three reels, 406, 408 and 410, are used to graphically represent various bonus outcomes. Dragons, 414 and 416, provide a theme to the bonus game but different themes can be used and the dragons are provided for the purposes of illustration only. In one embodiment, a bonus baccarat hand value can be associated with a player 422 and a bonus baccarat hand value can be associated with a banker 424.

In this embodiment, the bonus hand value for the player 422 is associated with reel 406 and the bonus hand value for the banker 424 is associated with the reel 408. In one embodiment, players place their side wagers on the bonus game outcome. The side wagers are then communicated to the controller. As described above, the controller can be a bonus controller, a table controller, a remote system controller or combinations thereof. Portions of the wager can be associated with a progressive game. Thus, the progressive value amounts, such as 402 and 404 can be incremented to include side wagers from current game.

The dealer can initiate game play by pulling first four cards as per the rules of baccarat and house procedure. In response to receiving a signal, such as from the electronic card shoe, an image recognition system or via an input device activated by the dealer, the three reels, 406, 408 and 410 can spin and at least the first and third reel will stop within some time period, such as within five seconds. If an electronic card shoe is used, the three reels may be begin to spin in response to a signal indicating a card has been drawn from the electronic card shoe. The second reel might not stop unless there is a potential for a particular bonus award, such as bonus award resulting from a four way tie.

The player reel 406 and the banker reel 408 will stop on a hand value. In this example, the hand values range from zero to nine, which is the possible range of baccarat hands. In other embodiments, the hands can be selected to be in a subset of the baccarat game range, such as from zero to five or three to eight, etc.

The probability of selecting a hand for each of the player 422 and the banker from within the designated range can vary. For example, the probability of selecting each hand value within a range can be equal. In other embodiments, the probability of selecting one hand value can be greater than other hand values. For example, the probability of generating a hand value of one can be twice as great as generating a hand value of zero. A hand value of zero can be given a very low probability of being selected for one or both of the player 422 and the banker 424 so that a greater payout can occur when a hand value of this amount is matched.

The hands are represented as a total number. In other embodiments, the hands can be represented as a two or three card combination where the cards which represent the hand values are selected randomly selected. Using the two and/or three card combinations to represent the hand values can provide for additional variability and higher payouts. For example, a first award value can be based upon matching the hand values. A second higher award value can be based matching the hand value and the card values. As an example, the value on the reel can be a seven represented by a three and a four and the second award can be given when the player's hand has value of seven including a three and four.

A third higher award can be based upon matching, the hand value, the combination of cards and the suit. For example, the hand value on the reel can be an eight represented by a three of clubs and a five of clubs and a third award value can be achieved when the player's hand includes one or both of the three of clubs and five of clubs. The banker hand 424 on the reel 408 can be matched in a similar way by the banker hand on the table to generate different award values.

The first and third reel reveal a value of hand which can be matched by a player hand and a banker hand. The player hand and the banker hand are separately generated, such as via dealing tangible cards from a shoe. In one embodiment, the bonus can be based upon matching the dealt player and dealer hand values to the values generated on the reels. A pay table 450 can be used to represent outcomes 426 and an associated payout 428 for each outcome.

As an example, in pay table 450, one tie, either the dealer hand value matching the value on reel 408 or the player hand matching the value on reel 406 can result in a one to one pay out according to 430, i.e., the value of the original bet is matched. When a player hand value matches the value on reel 406 and the banker hand value matches the value on reel 408, a one to two pay out can result according to 432. A four way tie can refer to when a player hand value matches the value on reel 406 and the banker hand value 408 matches the value on reel 408 and the values on each reel match one another. In this instance, a value on the center reel 410 can be awarded.

In another embodiment, any two hands can be compared in this manner. For example, when two players are playing against the banker, then a bonus hand value can be generated for the first player and a bonus hand value can be generated for the second player. Then, the comparisons can be carried out in a manner similar to the preceding paragraph without using the dealer hand.

In one embodiment, the system can be configured to let an individual select pairs of hand in which to place a side wager. For instance, when two players are playing baccarat against a banker, the bonus can be configured to generate bonus hand values for each of the banker and the two players. Prior to beginning the game, the system may allow a user to make a side wager based upon the hand values and bonus hand values of: 1) the first player and the banker, 2) the second player and the banker or 3) the first player and the second player where each player may be able to select one or a combination of these wagers. For example, the first player may select a first bonus wager based upon the hand value of the banker and the first player whereas the second player may make three bonus wagers based upon all three combinations. A bigger award might be awarded if the second player wins all three of their bonus wagers.

The method can be extended to additional comparisons involving three or more card hands. For example, with the three hands (e.g., a banker, a player one and a player two), a bonus award may involve the banker, player one and player two values of their bonus hands and their primary game hands matching one or another and each other. This comparison allows for a six way tie. The six way tie can be associated with a larger award.

In other embodiments, rather than matching, beating a value of hand can be used. For example, in black jack, a bonus card hand can be generated for the dealer and the player may have to beat the dealer's card hand and bonus card hand to trigger a bonus outcome. In another example, a bonus card hand may be dealt for the dealer and the player. The dealer's card hand can be compared to one or more of the dealer's bonus card hand and the player's bonus card hand. In addition, the player's card hand can be compared to one or more of the player's bonus card hand and the dealer's card hand. Based upon different numbers of hands beating each other, a bonus outcome can be triggered.

In yet other embodiments, a lower hand value as compared to another hand value can be a bonus condition. For example, a bonus card hand can be dealt for a player. Then, the player's card hand can be compared to the bonus card hand. When the player's card hand is lower than the bonus card hard, a bonus outcome can be triggered.

In general, multiple card hands can be compared where a condition, such as one hand beating the other, one hand tying the other or one hand losing to the other, can be specified for the comparison. Then, bonus outcomes can be based upon the specified condition occurring or not. For example, four ties may be a trigger for a first bonus outcome, four beats may be a trigger for a second bonus outcome and two ties and two losses may be a trigger for a third bonus outcome.

In one embodiment, the center reel 410 can indicate a multiplier, first symbol, such as a pearl, or a second symbol, such as a fire pearl 412. The multipliers can vary from a range, such as five times to five hundred times the bonus wager. In 400, a multiplier of ten times 426 and fourteen times 420 are shown on the reels. The pearl awards 10% of the progressive. The fire pearl awards the entire progressive. The multipliers, the first symbol and the second symbol can each be designated a probability of occurring and then selected using a randomization source.

The dealer can finish out the game play based on standard rules of baccarat. When the final card is dealt to complete the hand, the server can determine all payouts and display them on the main display and/or the dealer interface display. The dealer can pay out normal wagers and side wagers as dictated by casino policy and procedure. The bonus wagers can be paid based on the pay table, such as 450.

In one embodiment, if the one of the pearl level progressives are achieved, the payout of the amount can be divided automatically by the number of customers making the side wager based on the value entered by the dealer at the beginning of the hand. The value can be displayed on the main monitor as the "players share." In another embodiment, as described above player's can each have their own bonus outcomes and hence, the jackpot may not be shared.

In a particular embodiment, side wagers can be entered manually by the dealer. The manual procedure can have the dealer to enter in the total number (not value) of side wagers. The side wager can be designed with a fixed value. Thus, the number of side wagers can be used to determine the total side wager amount. The progressive can be incremented based on the total side wager amount.

In another embodiment, a chip "dumping" technique can be used where a number of chips associated with the side wager are counted by some mechanism. The chips can be dumped into the mechanism to initiate the counting process. If the side wager amount is fixed and only a single value of chip is allowed for the wager, then the number of chips can be counted to determine the number of side wagers which are made. In another embodiment, an area on a table near each player station can be configured with a sensor to detect a presence of a chip and thus, a number of side wagers which are made. In yet another embodiment, wagers, including side wagers, can be made using touch screen displays. Thus, side wagers can be detected in this manner.

An electronic shoe can be designed to keep track of game play and alert the dealer on overdraws. When the first card is drawn for the respective hand, a signal from the e-shoe to the controller can cause the reels to automatically spin. The e-shoe can read the cards as they are drawn and communicate the card information to the controller. The controller can determine hand values. All side wager outcomes can be determined by the controller. The dealer can be prompted as to the correct value to pay out by the display and/or the dealer interface.

In one embodiment, wagers can be variable and the use of multipliers used instead of fixed payouts. This method might be used instead of a progressive. In another embodiment, the dealer may have to enter the total dollar value of the side wager rather than the fixed units so that the progressive can be properly incremented. This approach may impact the pace of play if performed manually.

Figure 6:
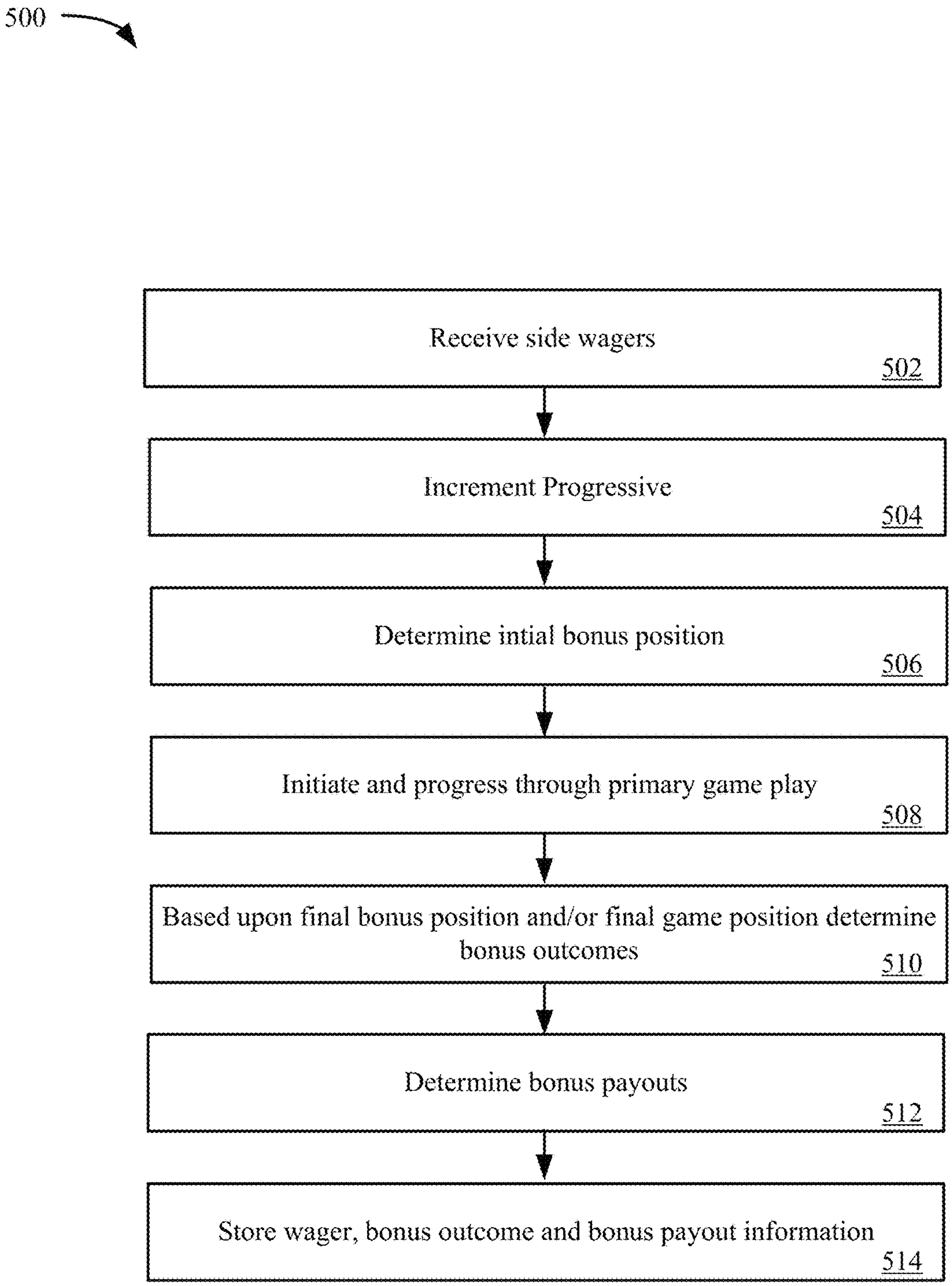
FIG. 6 is a flow chart of a method used in a bonusing system in accordance with the described embodiments.

FIG. 6 is a flow chart of a method used in a bonusing system in accordance with the described embodiments. In 502, the bonusing system can receive an indication of side wagers made in addition to the play of the primary game. In one embodiment, to participate, the player needs to bet on the primary game and bonus game. In another embodiment, such as a back betting scenario, the player may be allowed to participate by making only a wager on the bonus game.

In 504, when a progressive jackpot is provided, a value of the progressive can be incremented according to the side wager amount. In 506, an initial bonus position can be determined and output, such as output to a display. In 508, the primary game can be initiated and primary game play can proceed to a final primary game position. In one embodiment, the bonus position can change from an initial bonus position to a final position. In some embodiments, the bonus position can be affected by one of the primary game positions. In other embodiments, the bonus position can be advanced independent of the primary game rules.

In 510, based upon the final bonus position and/or the final game position, the bonus outcomes can be determined. In 512, the bonus payouts associated with the bonus outcomes can be determined. Information associated with the wager, bonus outcome and possibly initial to final bonus positions can be stored to a non-volatile memory. The bonus system can be fault tolerant, such as power hit tolerant, such that if an error occurs, such as a power failure, during game play, bonus position information which has been displayed can be recalled after power is restored. Thus, if bonus positions are displayed during primary game play and then the power fails prior to the completion of the primary game play, the bonus positions can be retrieved and the primary and bonus game can be completed.

Embodiments of the present invention further relate to computer readable media that include executable program instructions for performing recruiting techniques described herein. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A gaming system comprising:

a table including a table layout having a plurality of player positions each of the player positions including a first location used to place first wagering chips associated with a primary wager and a second location used to place second wagering chips associated with a bonus wager wherein the first wager chips and the second wager chips are each associated with a cash value;

a detection mechanism which detects at least when second wagering chips are placed at the second location on the table;

an automatic card shuffler that shuffles playing cards used to play a card game;

a bonus device including:

an input mechanism to receive wager information on an outcome of a bonus game wherein the wager information is determined from a value of the second wagering chips;

a first communication interface configured to receive card information associated with the card game;

a second communication interface configured to communicate with a remote server to at least receive at least one progressive jackpot amount and send an amount used to increment the progressive jackpot amount;

a controller, including a processor, a memory and a randomization source, coupled to the input mechanism, the first communication interface, the second communication interface and a display, the controller configured to:

1) receive the wager information from the input mechanism, 2) based upon the wager information, determine the amount and communicate the amount to the remote server;

3) receive a communication indicating the card game is about to start, 4) in response to receiving a communication indicating the card game is about to start, generate a first bonus hand value and a second bonus hand value using the randomization source and a probability table wherein the first bonus hand value is selected from a first range of values, each of the values in the first range associated with a probability in the probability table, and wherein the second bonus hand value is selected from a second range of values, each of the values in the second range associated with a probability in the probability table, and wherein the values in the first range and the values in the second range are possible card hand values in the card game;

5) receive the card information;

6) based upon the card information, determine a first card hand value and a second card hand value;

7) determine whether the first card hand value matches the first bonus hand value, whether the second card hand value matches the second bonus hand value and whether the first bonus hand value matches the second bonus hand value;

8) when the first card hand value doesn't match the first bonus hand value and the second card hand value doesn't match the second bonus hand value, determine a first bonus outcome, 9) when the first card hand value matches the first bonus hand value or the second card hand value matches the second bonus hand value, determine a second bonus outcome;

10) when the first card hand value matches the first bonus hand value and the second card hand value matches the second bonus hand value, determine a third bonus outcome;

11) when the first card hand value matches the first bonus hand value, the second card hand value matches the second bonus hand value and the first bonus hand value matches the second bonus hand value, determine a fourth bonus outcome using the probability table and the randomization source wherein the fourth bonus outcome includes a probability of awarding all or a portion of the progressive jackpot amount; and 12) control output to the display of the first bonus hand value, the second bonus hand value, one of first bonus outcome, the second bonus outcome, the third bonus outcome or the fourth bonus outcome and the progressive jackpot amount.

2. The gaming system comprising of claim 1, wherein the first range of values is identical to the second range of values.

3. The gaming system comprising of claim 1, wherein the first range of values is different than the second range of values.

4. The gaming system comprising of claim 1, wherein the first range of values or the second range of values is identical to a range of possible card hand values associated with the card game.

5. The gaming system comprising of claim 1, wherein the first range of values or the second range of values is a subset of a range of possible card hand values associated with the card game.

6. The gaming system comprising of claim 1, wherein a probability of generating at least one value in the first range of values or in the second range of values is similar to a probability of receiving a card hand with the at least one value in the card game.

7. The gaming system comprising of claim 1, wherein a probability of generating at least one value in the first range of values or in the second range of values is substantially different to a probability of receiving a card hand with the at least one value in the card game.

8. The gaming system comprising of claim 1, wherein the first bonus hand value or the second bonus hand value is output in a numerical format.

9. The gaming system comprising of claim 1, wherein the first bonus hand value or the second bonus hand value is output graphically as a combination of cards associated with the card game.

10. The gaming system comprising of claim 9, wherein the controller is further configured to render graphically the first hand value or the second bonus hand value on a reel, which rotates and stops to show the first hand value or the second bonus hand value.

11. The gaming system comprising of claim 1, wherein the first card hand value is associated with a first player participating in the card game and the second card hand value is associated with a second player participating in the card game.

12. The gaming system comprising of claim 1, wherein the input mechanism is a touch screen display.

13. The gaming system comprising of claim 1, further comprising an electronic card shoe wherein the card information is received from the electronic card shoe configured to hold one or more randomly ordered cards and read information from the cards each time a card is dispensed from the electronic card shoe.

14. The gaming system comprising of claim 1, wherein the fourth bonus outcome is randomly selected wager multiplier.

15. The gaming system comprising of claim 1, wherein the controller is further configured to render graphically a plurality of possible fourth bonus outcomes on a mechanical reel, which rotates and stops to reveal the fourth bonus outcome.

16. The gaming system comprising of claim 1, wherein the card game is baccarat.

17. The gaming system comprising of claim 11, wherein the first range of values and the second range of values are both between zero and nine.

18. The gaming system comprising of claim 11, wherein the first card hand value is associated with a banker and the second card hand value is associated with a player.

19. The gaming system comprising of claim 1, wherein the card game is blackjack.

20. The gaming system comprising of claim 19, wherein the first card hand value is associated with a dealer and the second card hand value is associated with a player.

21. The gaming system comprising of claim 1, wherein the display is coupled to a table where the card game is played such that the display is visible to one or more players playing the card game at the table.

22. A gaming system comprising:

a table including a plurality of player positions each of the player positions including a first location used to place first wagering chips associated with a primary wager and a second location used to place second wagering chips associated with a bonus wager wherein the first wager chips and the second wager chips are each associated with a cash value;

a detection mechanism which detects at least when second wagering chips are placed at the second location on the table;

an automatic card shuffler that shuffles playing cards used to play a card game;

a bonus device including:

an input mechanism to receive wager information on an outcome of a bonus game;

a first communication interface configured to receive card information associated with a black jack game;

a second communication interface configured to communicate with a remote server to at least receive at least one progressive jackpot amount and send an amount used to increment the progressive jackpot amount;

a controller, including a processor, a memory and a randomization source, coupled to the input mechanism, the first communication interface, the second communication interface and a display, the controller configured to:

1) receive the wager information from the input mechanism wherein the wager information is determined from a value of the second wagering chips;

2) based upon the wager information, determine the amount and communicate the amount to the remote server;

3) receive a communication indicating the black jack game is about to start, 4) in response to receiving a communication indicating the black jack game is about to start, generate a dealer bonus hand value using the randomization source and a probability table wherein the dealer bonus hand value is selected from a first range of values, each of the values in the first range associated with a probability in the probability table, wherein the values in the first range are possible card hand values in the black jack game, and wherein the first range of values is a subset of a range of possible card hand values associated with the black jack game;

5) receive the card information;

6) based upon the card information, determine a dealer card hand value and a player card hand value;

7) determine whether the player card hand value is over twenty one;

8) when the player card hand value is less than twenty one, determine whether the player card hand value is greater than the dealer card hand value and whether the player card hand value is greater than the dealer bonus hand value;

8) when the player card hand value and is greater than dealer hand value and when the player card hand value is greater than the dealer bonus hand value, determine a first bonus outcome, 9) when the player card hand value is matches the dealer hand value and when the player card hand value is greater than the dealer bonus hand value, determine a second bonus outcome;

10) when the player card hand value is less than the dealer hand value and when the player card hand value is greater than the dealer bonus hand value, determine a third bonus outcome;

11) based upon one of the first bonus outcome, the second bonus outcome or third bonus outcome, determine a fourth bonus outcome using the probability table and the randomization source wherein the fourth bonus outcome includes a probability of awarding all or a portion of the progressive jackpot amount; and 12) control output to the display of the dealer bonus hand value, one of first bonus outcome, the second bonus outcome, the third bonus outcome or the fourth bonus outcome and the progressive jackpot amount.

* * * * *